(12) United States Patent
Cobb

(10) Patent No.: US 6,199,102 B1
(45) Date of Patent: *Mar. 6, 2001

(54) METHOD AND SYSTEM FOR FILTERING ELECTRONIC MESSAGES

(76) Inventor: Christopher Alan Cobb, 500 Beale St. Apt.120, San Francisco, CA (US) 94105

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,950

(22) Filed: Aug. 26, 1997

(51) Int. Cl.[7] .................................................... G06F 15/16
(52) U.S. Cl. ........................ 709/206; 709/204; 709/202; 709/203; 709/205
(58) Field of Search ........................ 395/200.32, 200.33, 395/200.36, 200.51, 200.03; 379/57; 380/25, 50; 709/206, 204, 238, 246, 202, 203, 205

(56) References Cited

U.S. PATENT DOCUMENTS

| 5,093,918 |   | 3/1992  | Heyen et al. ........................ 395/725 |
| 5,377,354 | * | 12/1994 | Scannell et al. .................... 709/103 |
| 5,619,648 |   | 4/1997  | Canale et al. .................. 395/200.01 |
| 5,796,840 | * | 8/1998  | Davis ...................................... 380/50 |
| 5,859,967 | * | 1/1999  | Kaufeld et al. ...................... 713/200 |
| 5,909,589 | * | 6/1999  | Parker et al. ........................... 712/32 |
| 5,930,479 | * | 7/1999  | Hall ........................................ 709/238 |
| 5,999,967 | * | 12/1999 | Sundsted ................................ 705/14 |
| 6,112,227 | * | 8/2000  | Heiner .................................. 709/203 |

OTHER PUBLICATIONS http://www.crl.com~michaelp/stopjunkmail.html, Nov. 1996.*
http://www.news.com/News/Item/0,4,106,00.html, Sep. 1996.*
http://www.panix.com/uce.html, Feb. 1997.*
http://www.zdnet.com/anchordesk/talkback/talkback_35298.html, Aug. 1997.*

* cited by examiner

Primary Examiner—Glenton B. Burgess
Assistant Examiner—Quoc-Khanh Le
(74) Attorney, Agent, or Firm—Knobbe, Martens, Olson & Bear, LLP

(57) ABSTRACT

The present invention provides a system and method for filtering unsolicited electronic commercial messages. A system and method according to the present invention for screening out unsolicited commercial messages comprises the steps of receiving a message from a sender, sending a challenge back to the sender, receiving a response to the challenge, and determining if the response is a proper response.

37 Claims, 9 Drawing Sheets

| FIG. 7A | FIG. 7B |

FIG. 7

METHOD AND SYSTEM FOR FILTERING ELECTRONIC MESSAGES

FIELD OF THE INVENTION

The present invention relates generally to the receipt of electronic messages, via the Internet for example, and more particularly, to a system and method for filtering unsolicited electronic commercial messages.

BACKGROUND OF THE INVENTION

By taking advantage of the growing popularity of the Internet, a user can send messages to a receiver located virtually anywhere in the world. There are a number of advantages to sending messages via electronic mail (email) rather than through the U.S. Postal Service. By using email, it may take only seconds for the sender's message to be received by a receiver on the other side of the world. The receiver can read the sender's text immediately on the screen, respond to it right away, save it for later, print it, or quickly forward it to another receiver. Messages a user receives can be organized into convenient electronic folders and saved for as long as the user wishes without taking up office space. Due to these advantages, email has become many people's principal means of communicating with the world.

A further function of electronic mail allows a user to create electronic mailing lists for sending notices to hundreds or even thousands of people at once. Due to the ease of sending electronic mail to a very large number of people, the number of mass mailings for unsolicited advertising has risen dramatically. Unlike advertisements through the U.S. Postal Service, it is not necessarily clear to the user that the message is for advertising purposes until the user opens and reads the message. Thus, the target of the unsolicited electronic commercial message must typically open the message, read a portion of it, then, after determining it to be unwanted "junk", delete it. A user receiving several of these commercial messages can easily expend valuable time, resources and mental aggravation.

Companies and individuals in the business of mass commercial emailing have shown a reluctance to stop their practice or refrain from contacting recipients who do not want to receive promotions. This business, like traditional junk mail, is profitable. Since the cost of sending emails is so low, a junk e-mailer (commonly referred to as a "spammer") benefits by contacting the largest and broadest group of recipients as possible—more recipients means more people who might be interested in the message—even if it also means a larger group of outraged recipients.

Members of the electronic community have tried to create numerous roadblocks to stop spamming—some electronic, some legal, and some with a business focus. Unfortunately, the junk email sending community has generally adapted to and overcome each one.

An attempt to request the advertiser to stop soliciting the user is typically severely hindered since it is common practice for advertisers to either not provide a reply address or to make up a false reply address. Since some email systems (the Internet in particular) do not require a valid reply address nor a valid sender name, most ads can be repeatedly sent to thousands of people without giving the recipients a convenient method to request that they be taken off the advertiser's list. Spammers who do provide valid reply information are often unresponsive to requests to desist. Accordingly, thousands of email users must suffer through a barrage of unwanted email advertisements which typically must be opened in order to determine that it is an (unwanted) advertisement. In lieu of a valid email reply address, some of these unsolicited commercial messages will give a non toll-free number. In order to contact the advertiser, the user must pay for a phone call which may be long distance.

There is currently an attempt to address these issues of unsolicited commercial messages by legislative means. However, since it is relatively simple for an advertiser to access a server virtually anywhere in the world in order to send his unsolicited commercial message to anywhere else in the world, U.S. legislation may have, at best, a limited effect on the problem.

Some users have tried to avoid this problem by posting notices threatening to sue if unsolicited commercial messages are sent to them. However, since most unsolicited commercial messages are sent to thousands of people at a given time, it is quite likely that the advertisers would never see the notice.

Accordingly, what is needed is an effective system and method for filtering unsolicited electronic commercial messages. The present invention addresses such a need.

SUMMARY OF THE INVENTION

The present invention provides a system and method for filtering unsolicited electronic commercial messages. A system and method according to the present invention for screening out unsolicited commercial messages comprises the steps of receiving a message from a sender, sending a prompt back to the sender, receiving a response to the prompt, and determining if the response is a proper response.

According to the present invention, when an electronic message is received, unless the sender is part of a list of senders to accept messages from, it is determined if the sender address is a valid address. If the sender address is not a valid address, then it can be assumed that it is an unsolicited commercial message. However, if the sender address is valid, then a prompt is sent to the sender. The prompt can be any question which can be answered by a person but typically not by a computer system. If a correct response to the prompt is received thereafter, then the message can be assumed not to be a mass mailed unsolicited commercial message, and accordingly is not filtered out. If incorrect, the message is filtered.

DESCRIPTION OF THE INVENTION

Figure 1:
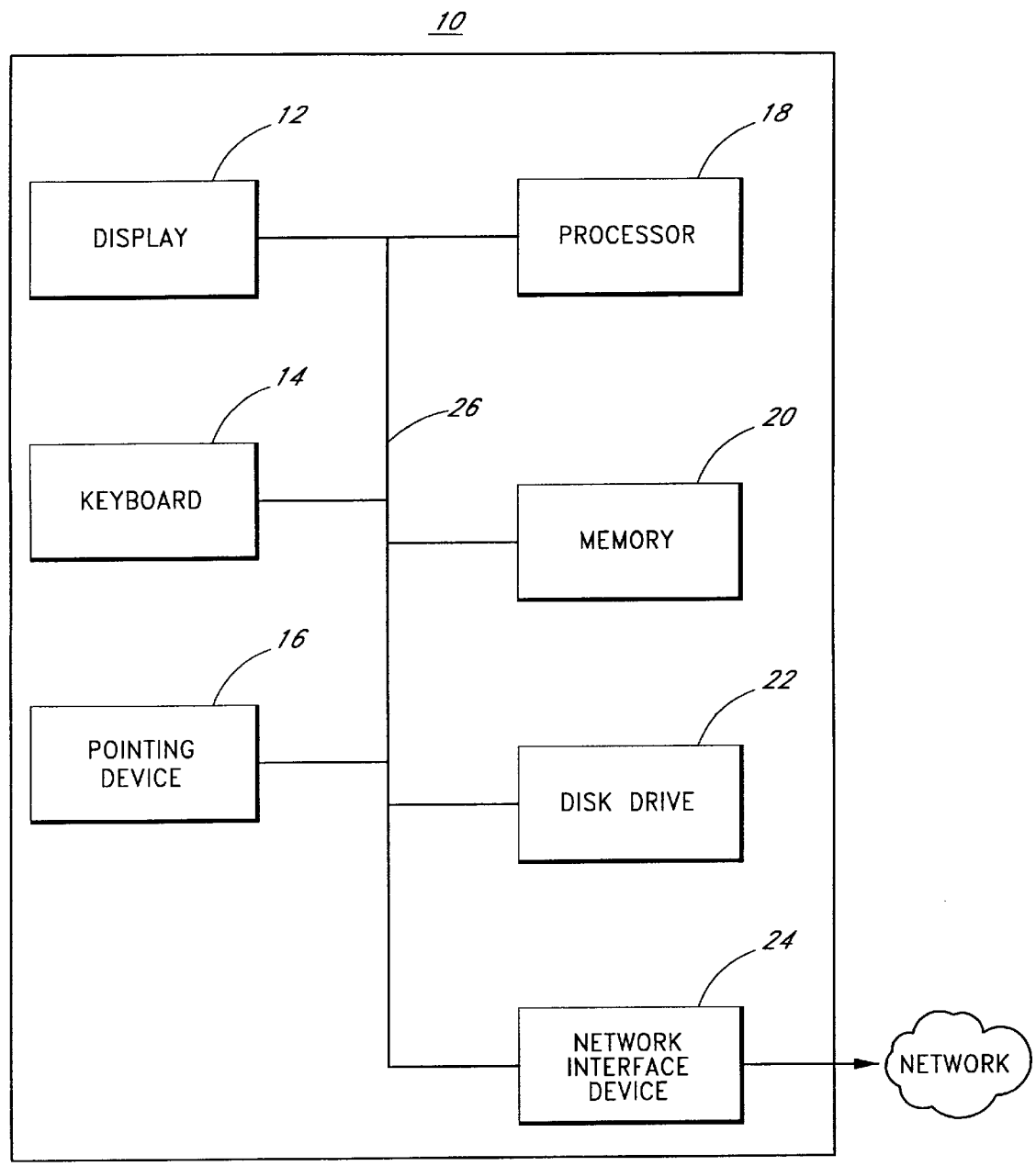
FIG. 1 is a block diagram of a computer system in which the present invention can reside.

The present invention relates to a system and method for screening out unsolicited commercial messages. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Although the present invention is described in terms of a system which receives e-mail, it is to be understood that email is merely an example in which the present invention can be applied. For instance, the present invention can also be applied to electronic messages in video form wherein unsolicited commercial messages can be sent via video.

In an attempt to solve some of the problems related to unsolicited commercial messages in the electronic medium, a message filter is currently available. However, it has been found that the conventional message filter is highly ineffective in screening out unsolicited commercial messages.

Conventional message filtering involves the use of a mail filter in an email recipient's local email system. Such a filter typically sorts incoming email for the recipient into categories determined by the recipient. The filter typically simply scans elements of each email message as it reaches the recipient and determines what category it should be placed in depending on certain criteria. One category is "discard". Messages which the filter places in the discard category are automatically discarded, but in practice the direct deletion of messages via a filter is extremely risky. A perfect filter would catch and dispose of all junk messages and retain all non-junk messages, but such a filter has yet to be demonstrated. This imperfection is primarily caused by the inability of most filters to determine what constitutes "junk email". For this reason, most filter designs take a different approach and move suspected junk messages to a temporary or miscellaneous holding category for review by the recipient before deletion. Invariably, desired messages are accidentally marked for deletion and junk messages slip through the filter. The user must typically manually correct these mistakes.

Conventional filters have had varying degrees of intelligence; some have simply worked with lists of mail addresses and have sorted messages according to the source of the message; others have used keywords provided by the recipient to sort; with others, finally, the filter observes how the recipient sorts his email and is then able to sort in a similar fashion (usually by utilizing a combination of the two previous methods—source lists or keyword/content searches).

Each of the message filtering methods has weaknesses that can and typically are exploited by junk email senders. The source list method requires a message sender to be on a list (either an acceptance or blocking list) in order to permit the filter to take action. A message from an unknown sender (frequently a solicitor) cannot be discarded because it might be from, for example, a new business contact or a long-lost friend. By constantly using new sender addresses, a solicitor can assure that junk messages will pass through a source list filter and come to rest in a temporary or miscellaneous category reserved for messages that are not actionable. Messages in this category must typically, at least briefly, be scanned by the recipient—a successful defeat of the filtering mechanism. The second method—keyword/content searching—has the potential of discarding wanted, as well as unwanted, messages. Any keyword or phrase search (with the intention of identifying and dealing with particular message subject matters) will eventually discard a bona fide message that appears to be "junk" in nature. For example, searching and discarding all messages with the words "make money" in them might get rid of some junk messages, but it will also eventually discard a desired message such as a new business idea from a brother or sister that happens to use the same words or word patterns. Again, the flaws in this approach force most implementations to place incoming messages in a temporary holding category. And again the messages in this category will, at least briefly, be scanned by the recipient a success for the solicitor.

It should be noted that there are some message filtering techniques that rely upon the sender to indicate the subject or target audience of their message. The recipient's filter can then look for and operate on these messages with the recipients best interests in mind. These can work successfully, for example, in a corporate environment where both the senders and recipients have a working relationship and an active interest in effectively using each other's time and communication resources wisely. For example, all incoming resumes might be marked as high priority for a human resources manager, but the sender would have to indicate, via a predetermined method, that the content of the message was a resume. The human resource recipient could then configure their email processing system to categorize and correctly handle these resumes. These techniques are ineffective, however, when the sender is not cooperative and uninterested in having their messages intercepted and screened by this mechanism. Most junk email senders on the Internet fall into this category. The business of sending junk email is typically profitable, legal, and effective. There is no incentive for such an individual or company to actively make it easier for recipients to discard or ignore their messages. Indeed, most spammers make money by emailing more individuals, not less. Any technique, therefore, that attempts to stop this flow of unwelcome messages, can not rely on the cooperation of the message senders. In fact, this group has shown the exact opposite tendency in actively pursuing means of circumventing any and all filtering techniques.

Even if these filtering techniques provided a reasonable means of relief from the junk email onslaught, they still suffer from the need to be actively maintained. For example, source lists must continually be updated as solicitors use new sender addresses. And keyword lists must be continually modified as solicitors send widely varying and extremely creative messages which resemble legitimate communications. In either case, the temporary holding category must typically be reviewed for mistakes and the filtering apparatus must be maintained. Junk email usually causes frustration because of the time wasted in dealing with it. The use of conventional message filters has simply traded one means of spending time with another with no net gain.

Accordingly, what is needed is an effective system and method for screening out unsolicited electronic commercial messages. The present invention addresses such a need.

A feature of the present invention is the checking of incoming messages to verify that they include valid sender information. Any message which does not contain a valid sender address is assumed to be a junk email communication and is dealt with appropriately (generally deleted).

The "validity" of a sender address will depend on the specifics of whatever communication system is being used. On the Internet, for example, a sender address cannot contain certain characters (such as 'control' characters), must include an AT "@" symbol, and must be from a registered domain name. Each of these requirements (as well as others) can be checked. A sender address which violates any of them would be invalid.

Another feature of the present invention is the checking of incoming messages to verify that each message is properly addressed to the user (the recipient). For example, a message which is not addressed to the recipient will be assumed to be a junk email communication and dealt with appropriately (generally deleted).

When determining whether an incoming message is actually addressed to the recipient, the method according to the present invention will consider various appropriate recipient designations for the messaging system being used. In other words, it is possible that the recipient will receive a valid message that is not directly addressed to him. Instead, he might be a CC (carbon copy) recipient, or perhaps a BCC (blind carbon copy) recipient. There may be other possible message recipient designations. As long as the invention user's address is present on at least one of these recipient designations the message is considered valid. If the user's address is absent from all of these recipient groups the incoming message is considered junk email.

Yet another feature of the invention is that it prompts unrecognized email senders, for example, by returning their message and asking them a predetermined question or one of a set of predetermined questions:

"What color is an orange?"

"What is the ocean made of?"

"Fire is not cold, it is ?"

"How many wheels on a car?"

"Muhammad Ali is a (a) boxer, (b) man, (c) horse, (d) airplane.

Choose all that apply."

Most humans can answer these questions, but it would be an enormous task to do so with a computer. In order to communicate with the recipient, the sender must correctly answer the question they are asked.

Preferably a block of text is added to the beginning of an incoming email message from an unknown sender. The sender's original message is preferably preserved. This block of text is referred to as a Challenge and contains, among other elements, a prompt, such as a question similar to those above. It also contains an answer blank area where the sender is requested to place their response to the prompt. After adding the Challenge text to the original message, thereby creating a modified message, the modified message, is returned to the sender. The sender must answer the Challenge (which includes the prompt) and send it back to the recipient. Upon receiving a completed Challenge, the answers are checked for validity. If the answers are correct, the message is forwarded to the recipient. Otherwise the message is blocked and discarded.

Recall that many senders purposely make themselves unreachable. If they are not reachable, they will never receive the Challenge and their messages will automatically be discarded.

If, on the other hand, they provide accurate sender information they will then be inundated by Challenges from users of this invention, in addition to vast quantities of undeliverable returned messages and other detritus. In order to reach users of this invention, the spammer must staff relatively large banks of people to answer these Challenges (because a computer cannot). The staff to sort through the incoming mess of messages and manually answer Challenges will cost money and hurt the profitability of the junk email business. Many in the business would likely choose to avoid this step by either not including a sender address or ignoring all returned email—in either case their unwanted transmissions do not reach a user of the method and system according to the present invention.

FIG. 1 is a block diagram of a system in which the present invention can reside. The computer system 10 is shown to include a display 12, a keyboard 14, a pointing device 16, a processor 18, a memory 20, a disk drive 22, and a Network interface 24. These various components are shown to be coupled to a system bus 26.

Figure 2:
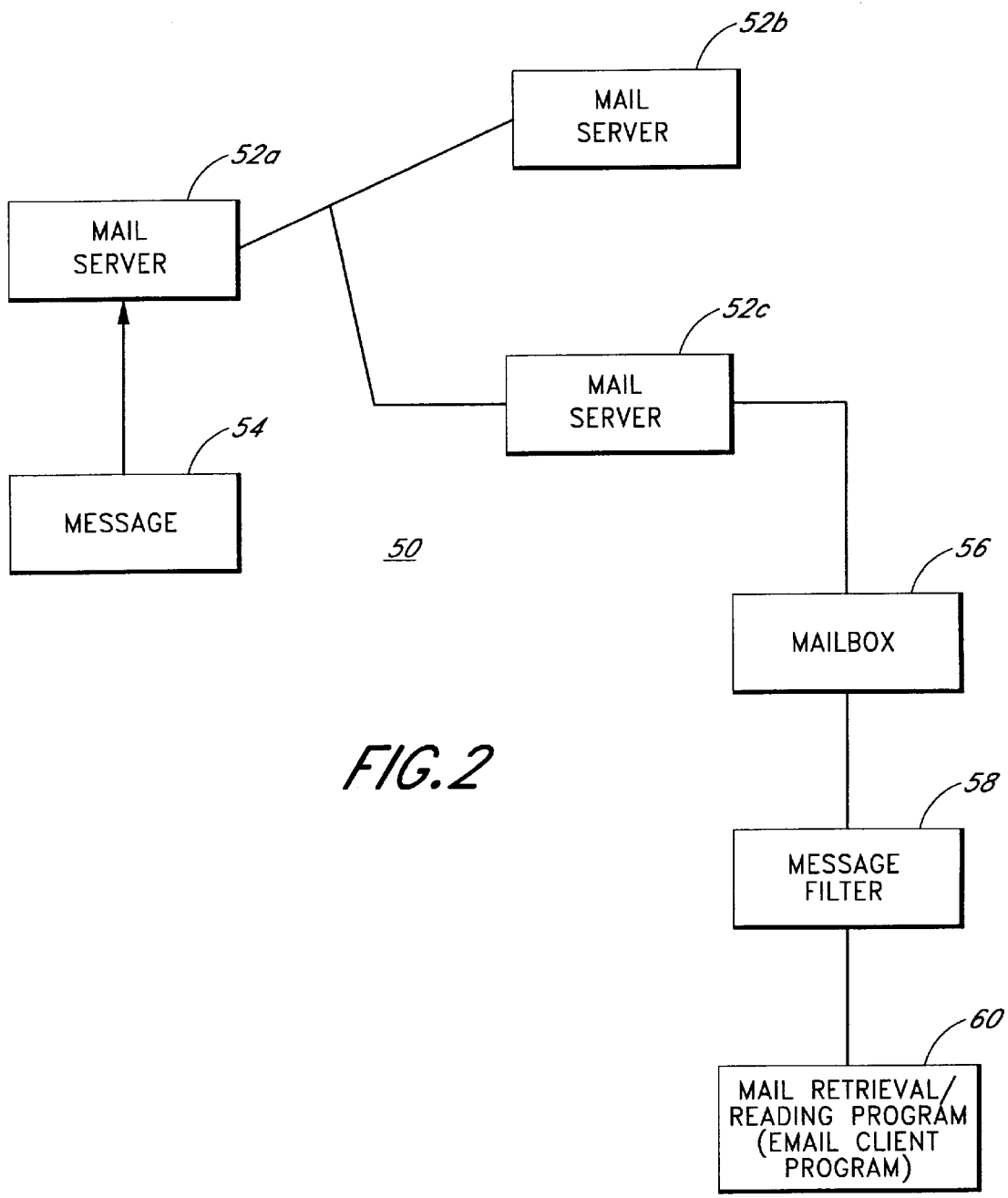
FIG. 2 is a block diagram of a network in which the present invention can operate.

FIG. 2 is a block diagram of networking system with which the present invention can work. The Internet system 50 is shown to include mail servers 52a–52c which utilize the standard protocol of Simple Mail Transfer Protocol (SMTP). A message 54 can be sent via one of the SMTP servers, such as the server 52a. The message may be passed through several servers before reaching its final destination, in this example, the server 52c. Once the message is received by the destination receiver 52c, then it is typically sent to a mailbox 56, such as a Post Office Protocol box (POP) or Internet Message Access Protocol box (IMAP) where it is held pending retrieval by an Email Client Program 60. During message retrieval, the message can be filtered through the Message Filter Program 58. Note that the Message Filter 58 according to the present invention can be located in various locations including between the Mailbox 56 and the user's Email Client Program 60; as part of mailbox servers such as Mailbox 56, or in the Email Client Program 60 which actually processes the user's messages. In the example shown in FIG. 2, the Message Filter 58 according to the present invention is shown to be located between the Mailbox 56 and the Email Client Program 60. In the following figure (FIG. 3), the message filter is shown incorporated into the Email Client Program.

Figure 3:
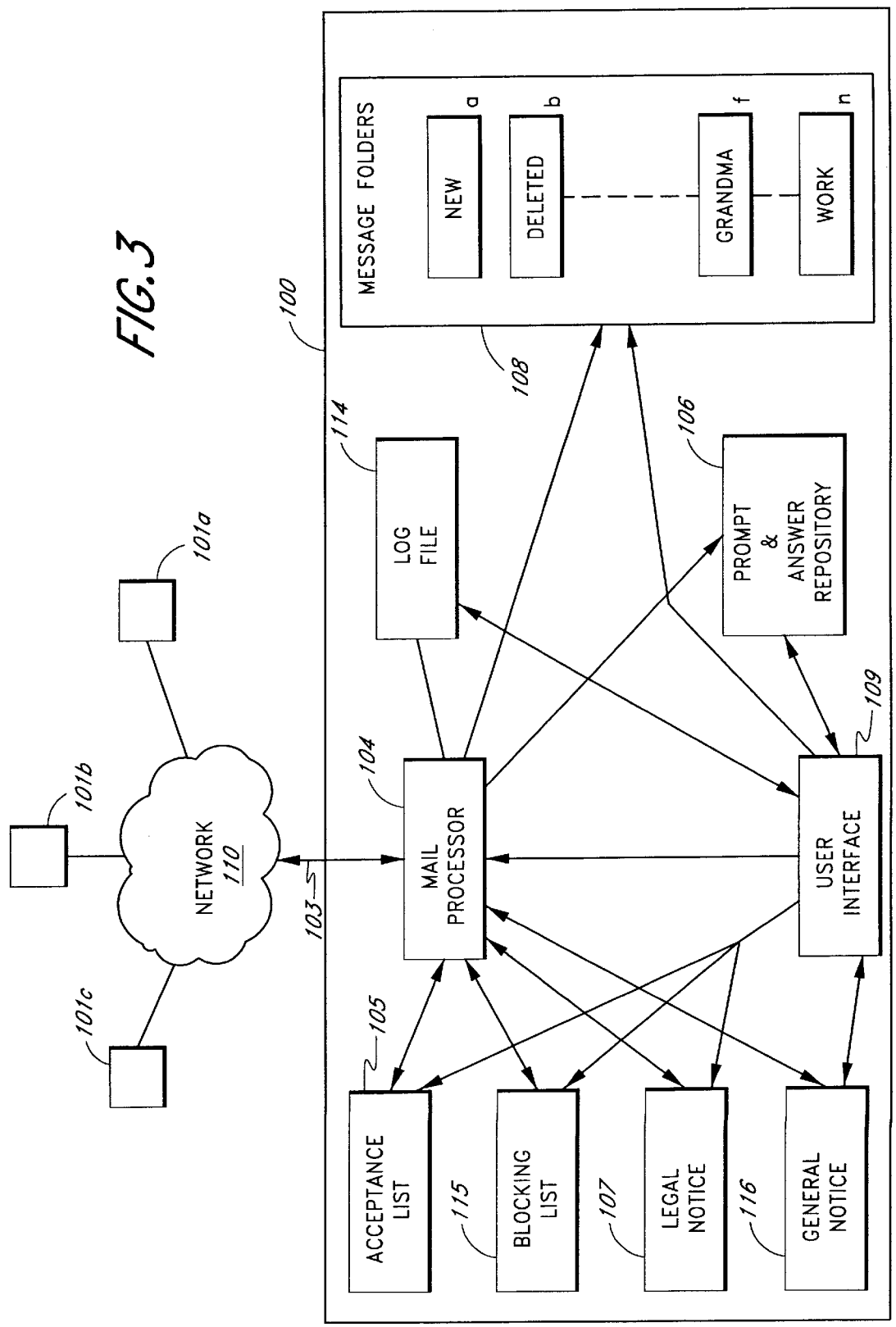
FIG. 3 is an example of a networking system in which the present invention can operate.

FIG. 3 is an example of a networking system in which the present invention can operate. Filtering Enabled Email Client Program 100 is shown communicating with a Network 110 that facilitates communication among other members of the network. Filtering Enabled Email Client Program (FEECP) 100 is resident and actively run on a computer system illustrated in FIG. 1 which also provides the network connection.

Filtering Enabled Email Client Program 100 communicates with Network 110 which connects a number of Users 101a–101c. Network 110 may be a network such as the Internet or a commercial email network, or it may be a 101c an email system which communicates internally between users of a single computer system. Users 101a–101c are interconnected to this network by one or more links 103 over which each User 101 may send and receive electronic messages (email).

The Network 110 connects any number of computer systems 101a–101c, each being able to facilitate at least one user. Each user attaches to and interacts with the Network 110 (and other Users 101) by means of a device, generally a computer, that sends, receives, interprets, and acts upon the signals transmitted across the network. Each user 101, therefore represents not only an individual, but also the computing devices and email client programs that allow them to communicate over network 110. These computers may vary greatly in their construction and manner of use. They may contain different configurations of logic processing software and may have different capabilities (for example, some may have email client mail filters like this invention and some may not.) For the sake of this discussion, each will have, at the minimum, rudimentary capabilities to compose, send, receive, and manipulate electronic messages over network 110 by way of an email client program.

Filtering Enable Email Client Program 100 (and the user(s) that use it) has the same characteristics and capabilities as normal Users 101, but also implements the various part of the message filtering system of the present invention. The system and method according to the present invention allows the user to reduce the amount of junk email received from the network (and hence other users). There may be multiple users on the network that implement a Filtering Enabled Email Client Program 100, but this discussion will focus on only one such user for the sake of clarity.

Filtering Enabled Email Client Program (FEECP) 100

As a whole, FEECP 100 is primarily a software application. Each of FEECP 100's composite components (105, 106, 107, 108, 109, 114, 115) are likewise primarily software modules. As such, all of them utilize some combination of processing time, memory, long-term storage, video displays, input devices, pointing devices, and other common computer elements, components, systems, and/or processes. The exact computing requirements necessary to execute FEECP 100 will vary, but can easily be determined by someone skilled in the art. In general, FEECP 100 resides and operates on a reasonably powerful and reasonably configured computing device necessary to execute and carry out the described invention and each of its components. An individual skilled in the art could easily specify such a machine and most modern computing devices available to average consumers currently meet these criteria.

The Mail Processor 104 is the main transmission and processing component that retrieves and/or accepts incoming messages and filters them appropriately. Each incoming message is examined and processed by this component according to the flow chart in FIG. 7. During these steps, the Mail Processor 104 will utilize some or all of the secondary components of the FEECP 100. These secondary components include an Acceptance List 105, a Blocking List 115, Repository 106, General and Legal Notices 107, Message Folders 108 (a.n), a System Log File 114 and a User Mail Interface 109.

As mentioned, Mail Processor 104 also handles the transmission of electronic messages. All messages arrive and are sent via link 103, but the specific process involved will vary depending on the messaging platform. On the Internet (the platform for this preferred embodiment), incoming mail will typically be retrieved from a message storage device located on the Network 110 called a POP3 or IMAP server. When commanded (perhaps from the user or after a certain time interval), Mail Processor 104 will access one or more of these "mailbox" servers and retrieve the user's messages (if any). As these messages are retrieved, they are processed and filtered according to flow chart FIG. 7.

To send a message on the Internet, Mail Processor 104 will contact an SMTP mail server. This server is similar to a conventional post office and accepts outgoing mail for delivery. Any outgoing mail is transmitted to such a server by Mail Processor 104. Note that outgoing mail does not require any sort of filtering action and is delivered directly.

Acceptance List 105 contains zero or more email addresses or address patterns in a list—maintained on a non-volatile storage device—that can be retrieved, edited and saved.

The Acceptance List 105 contains email sender addresses (and therefore email senders) that are permitted to communicate unimpeded with the recipient. Any incoming message with a sender address contained in or matching a pattern on this Acceptance List will be permitted to reach the recipient.

This list may contain individual entries, such as "John_Smith@aol.com" (an Internet style address) or patterns such as "[all]@aol.com". This pattern could indicate that all messages from senders in the "aol.com" domain should be accepted and passed on to the recipient unimpeded.

A feature of the method according to the present invention is the automatic creation and maintenance of this Acceptance List. Under normal circumstances, this invention will add entries to the acceptance List based upon the filtering process outlined in flow diagram, FIG. 7. It is an option, however, for the user to manually add or delete an address or address pattern on this list, which could be done using User Interface 109.

The Blocking List 115, like the Acceptance List 105, also contains zero or more email address or address patterns in a list—also maintained on a non-volatile storage device—that can be retrieved, edited and saved. This list, however, performs the opposite function—any message with a sender address contained in or matching a pattern on the Blocking List 115 is filtered and blocked from reaching the recipient.

This list, just like the Acceptance List 105, may contain individual entries, such as "John_Smith@aol.com" (Internet style address) or patterns such as "[all]@aol.com".

Figure 7A:
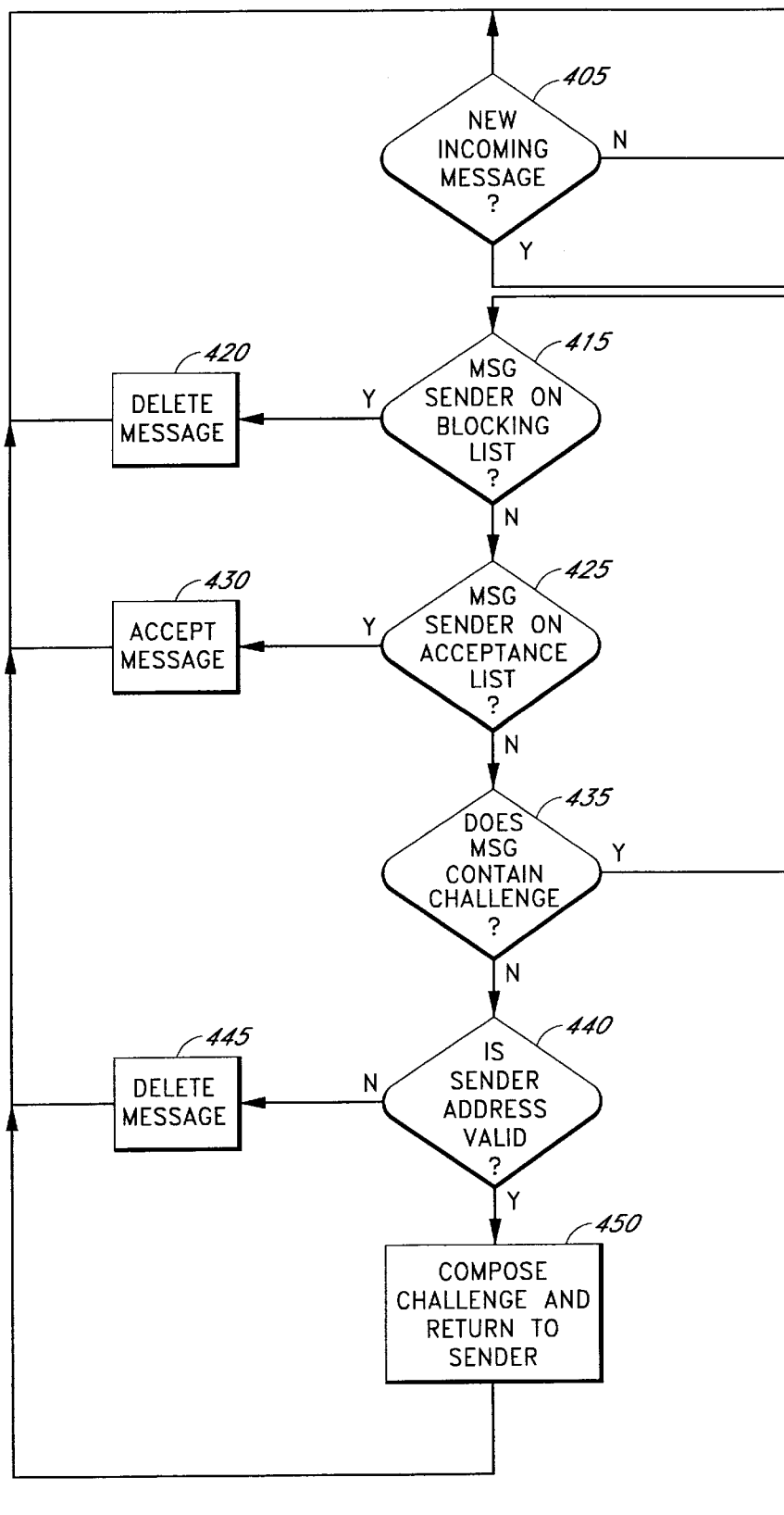
FIG. 7 is a flow diagram of a method according to the present invention.
Figure 7B:
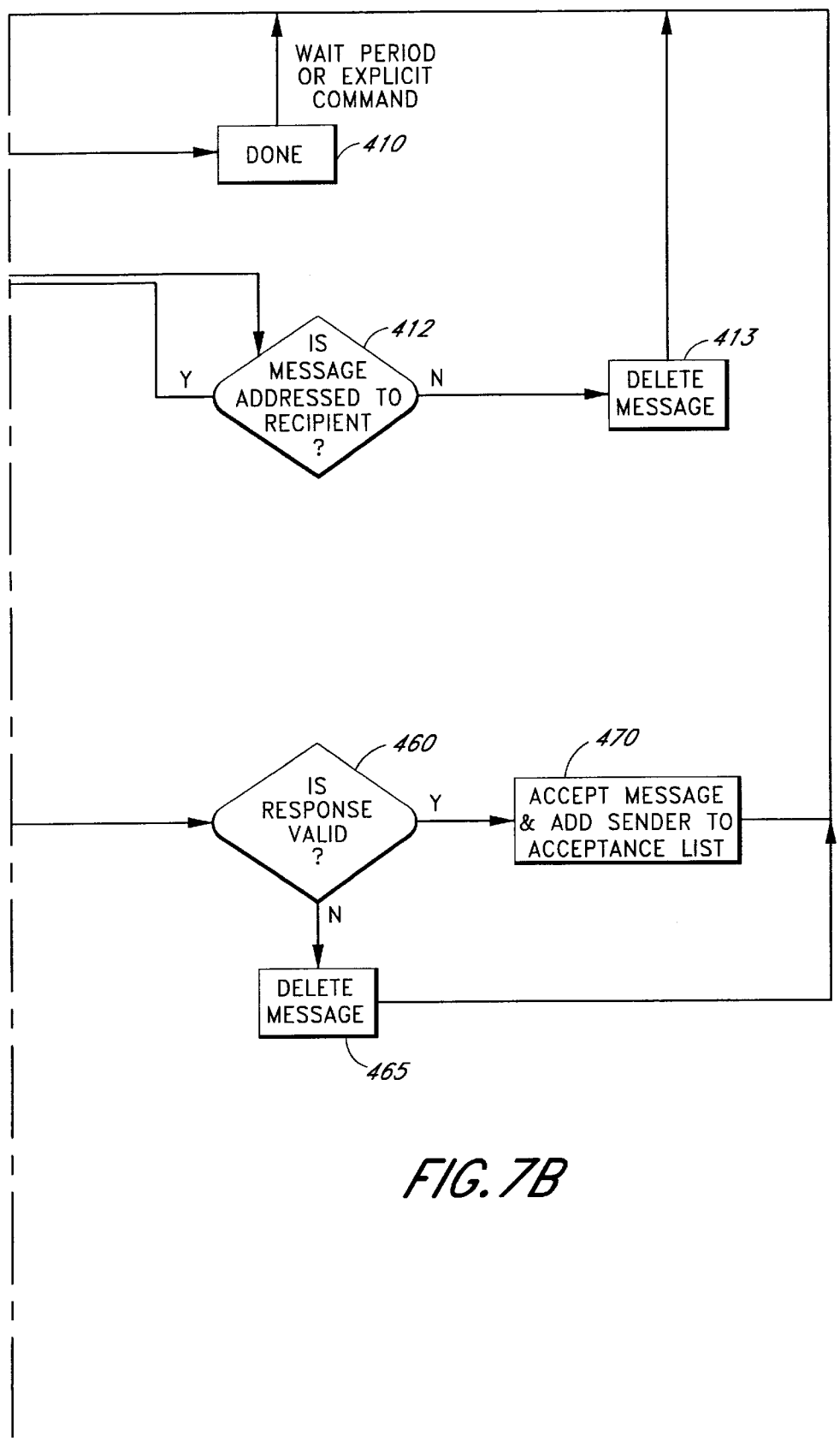

Unlike Acceptance List 105, the Blocking List 115 is not actively maintained by the filtering process described in FIG. 7. Instead, the blocking list is manually edited by the user.

If an email solicitor correctly answers a Challenge and reaches the recipient against his wishes, the recipient (i.e.—the user of this invention) can manually add the sender's address to Blocking List 115. (The manual entry of blocking addresses would occur through the use of the User Interface 109.) From that point forward, any incoming messages from that sender would be filtered and discarded.

Note that the Blocking List 115 preferably takes precedence over the Acceptance List 105. If a message sender's address exists on or matches patterns on both the blocking and acceptance list, the message is blocked. This is necessary in order to have ultimate blocking control over an unwanted message sender who gains admission to the Acceptance List 105 (by correctly answering a Challenge).

Referring now to the prompt and answer repository 106, when composing a Challenge, the Mail Processor 104 needs a prompt to place into the Challenge (which the sender must then answer and return). This prompt is taken from component 106 which stores one or more prompts and the acceptable answers to each of those prompts.

The prompts (and answers) stored in 106 could be entered as part of a pre-built, or commercial release of a method and system according to the present invention. This practice, however, would allow a junk email sender to procure the fixed prompt list and create an automated program capable of recognizing and answering the limited prompts therein. Instead, a feature of the present invention is that each user himself enters prompts (and answers) in to the Repository 106 (by using User Interface 109.) By having each user compose and enter their own prompts, the possible permutations are limited only by human imagination. In such a case, it would be extremely difficult, if at all possible, to automate the answering of Challenges because the variety of possible prompts would be too great.

When creating and entering a prompt, a user should strive to pick a topic and level of difficulty that do not exceed the mental capabilities with those whom they expect to communicate. Choosing prompts that few people could answer will have the effect of unintentionally blocking desired communications. (Note—specialized or difficult prompts could have a beneficial effect. A user could choose questions of a very personal nature so only people very close to him would succeed in being able to correctly answer a Challenge and therefore communicate. This might be a desired approach for wealthy or famous people.)

To enter a prompt, the user specifies, via User Interface 109, the command to enter a new prompt. They can then enter a free-form block of text. This block of text should, in some way, be able to elicit a predictable, printable response from a human.

The User Interface 109 would then allow entry of one or more acceptable responses for the prompt. At that point the user must enter at least one acceptable answer to the previously entered prompt. The user may enter multiple correct answers. Any response to the Challenge prompt that matches one of the answers entered is considered a "valid" and correct response. When matching a response to valid answers, the user has the option of enabling certain features. One of these features is case insensitivity. If enabled, all matches to the answer list are performed without regard to case. A second feature causes whitespace (spaces, tabs, linefeeds, etc.) to be ignored. If selected, all whitespace characters are removed from the beginning and trailing edges of the challenge prompt responses and all groupings of multiple, adjacent whitespace characters within the prompt are replaced by a single space. This is done before comparisons are made to the acceptable list.

Other features are also conceivable. For example, it would be possible for the comparison mechanism to understand common misspellings of words and compensate before determining the validity of a response. Many of today's word processors have this ability.

Prompt and Answer Example:

The user of this system could enter the following text as a prompt: "How many wheels on a car?". For the list of valid responses, the user could enter: "4", "four", "for", and "fore" ("for" and "fore" help accommodate human error). The user could enable the case insensitivity and whitespace ignore options. In this situation, the following Challenge responses (using that question) would be considered valid: "4", "4", "FOUR", "FOUR", and "foRe".

Each prompt stored in 106 is given a designated reference number (such as prompt 1, prompt 2, etc.) When composing a Challenge, the Mail Processor 104 includes the reference number of the prompts used into a specially delimited area of the Challenge. Therefore, when the Challenge is returned by the sender, it can be easily scanned to retrieve the prompt reference number without requiring the parsing of the Challenge text to match the complete prompt word for word. In this same way, the sender's answer can also be easily extracted from the Challenge because it too can be located in a specially delimited area of the message. For more information on the construction and processing of a challenge please see THE CHALLENGE.

There is a benefit to having multiple prompts in the Prompt Repository 106—it becomes possible to rotate or vary the prompt used for each Challenge. By having multiple prompts and rotating their use, it becomes difficult for a person or organization to catalog all the prompts used by a particular person and use this knowledge in an attempt to automate Challenge responses to that individual. For example, if a user of this Invention always used the question, "What color is an orange?", a solicitation company could record the answer and automate mailings to that individual by programming software to automatically respond with "orange" to any Challenge from that individual. The use of a large prompt repository makes this unlikely.

General Notice Repository 116

Besides a Challenge prompt, the system and method according to the present invention also uses a General Notice 116 and a Legal Notice 107 (below). The General Notice (primarily text) is stored, maintained, and retrieved from the General Notice Repository 107 which stores the Notice on a non-volatile storage device. The General Notice 107 can be modified through the use of User Interface 109.

The General Notice preferably is the first thing that a sender reads when their message is returned (with the included Challenge). It can be anything the user wants. It is suggested, however, that this information describe the reason the sender's mail has been returned (i.e. predicated upon a proper response to a Challenge) and the process that the sender must complete in order to reach the recipient (instructions on completing the Challenge prompt and Legal Notice). In addition, it might be advisable to include an alternate contact means such as an address or fax number where the recipient can be reached. This would be valuable if the sender, for some reason such as technical difficulties, cultural differences, or language differences, had trouble correctly responding to the Challenge. In such a situation, they could use the auxiliary contact means to reach the recipient. It would be important, however, to cover the auxiliary contact means in the Legal Notice as well as the recipient's email address.

Legal Notice Repository 107

Besides the General Notice 116, the system and method according to the present invention also uses a Legal Notice. This Legal Notice is stored, maintained (via User Interface 109) and retrieved from the Legal Notice Repository 107. The Legal Notice provides a means of stating and enforcing a legal agreement between the sender and receiver. It is preferable to state, to the effect, that the recipient does not accept unsolicited commercial communications. It should define and give specific examples of such communications. It would further state that appropriate legal action will be taken against any individual or company that violates the ban. And it should describe the fees and charges that will be levied for violating the agreement and improperly utilizing the recipient's time and computing resources. Other terms and conditions could be added at the discretion of the system user and based upon appropriate legal guidelines. The content described herein is for example purposes only.

This Legal Notice, like the Challenge prompt from 106, must also be answered correctly by the sender in order for the Challenge to be valid. Unlike the prompt from 106, however, the correct answer to the Legal Notice is always an affirmation. For example, after reading the Legal Notice as part of the Challenge, the user would be prompted to type the word "AGREE" in a designated blank. The Legal Notice should specify that typing "AGREE" signals an understanding and agreement to the terms of the notice. If the sender does not agree to the Legal Notice, their email communication will be filtered and blocked upon being returned to Mail Processor 104.

Message Folders 108

Email messages resident in the Filtering Enabled Email Client Program 100 are stored in categorized Message Folders 108($a$ . . . $n$). These Message Folders (and the messages contained within them) are stored on non-volatile storage and can be retrieved, created, manipulated, and stored through the use of User Interface 109. The messages contained (and to be contained) within the Message Folders can also be manipulated by the Mail Processor 104 during the process outlined in FIG. 7.

Each Message Folder 108($a$ . . . $n$) can be a distinguishing namex—chosen by the user of the system. All messages relating to a particular topic are categorized and stored in a Message Folder with an appropriate designation. (For example, all messages from a grandmother might be stored in a Message Folder entitled "Grandma".) A tidy user can create Message Folders for the main topic areas that cover his correspondence.

In addition to user created message folders, this system preferably has two special-purpose default message folders—"New" and "Deleted". Mail Processor 104 places all incoming email messages that are not filtered and not blocked into the "New" folder. Mail Processor 104 places all incoming email messages that are filtered and blocked into the "Deleted" folder. The filtering and blocking process is outlined in FIG. 7.

The user of this system examines the "New" message folder to read and manipulate any new messages which may have arrived. The user may choose to delete a new message (thus moving it into the "Deleted" folder) or save and categorize it by moving it to a user-created message folder (like "Grandma"). Or, the user may simply leave the message in the "New" folder. These options (and others conceivably) are performed at the wish of the user via User Interface 109.

Messages that are deleted (either by the Mail Processor 104 or manually by the user) are placed in the "Deleted" system message folder. By placing a message in this folder, it is not actually deleted. Essentially is becomes marked for deletion which will occur at some future event. This temporary holding of deleted messages allows the user to correct an accidental deletion or recover a wrongly filtered incoming message. To do so, the user simply moves the desired message out of the "Deleted" folder into another message folder. The permanent deletion of items in the "Deleted" message folder can be configured by the user to occur after various events including manually, after a time interval, and after a certain amount of "Deleted" email has been accumulated.

Log File 114

Every significant action that the Filtering Enabled Email Client Program 100 performs is preferably, at the option of the user, logged to the system Log File 114. Each action would be noted in this log along with specific information to make the entry useful. For example, an incoming message from "John_Smith@aol.com" whose address is on a Blocking List might cause a log file entry such as:

"BLOCKED: 'John_Smith@aol.com' on Jul. 3, 1997 2:34 pm. Subject of message: 'Real Estate Deal'"

The recording of this information is valuable, for example, in order to assist the user in determining whether certain messages are being blocked or deleted incorrectly.

User Interface 109

The User Interface 109 allows the user to manipulate, access, configure, and otherwise interact with the Invention and its components. The User Interface 109 consists of both a software and hardware component. The hardware component, at the minimum, includes an output display device (such as a video monitor) and one or more input devices (keyboard, mouse, etc.). The software component presents information and options to the user (via the display) and receives, interprets, and act upon commands from the user (input via the keyboard or similar device).

Each of the Filtering Enabled Email Client Program 100 components interacts with the user via the User Interface 109. Some examples of what the user can do:

Log File 114
  Read the log file
  Delete the log file

Mail Processor 104
  Change incoming message filtering options
  Send outgoing mail
Acceptance List 105 and Blocking List 115
  Clear either or both lists
  Add an address or address pattern to either list
  View entries on either list
Prompt & Answer Repository 106
  View the prompts and answers currently entered
  Edit prompts and/or answers currently entered
  Enter new prompts and answers
  Delete prompts and answers
General Notice 116 and Legal Notice 107
  View either or both notices
  Modify either or both notices
Message Folders 108(*a* . . . *n*)
  View or Read mail in any of the a.n folders
  Delete mail from a folder
  Delete a folder
  Create a new folder
  Rename a folder
  Move or Copy mail from one folder to another This list only shows some of the functions possible via the User Interface 109. Anyone skilled in the art will immediately recognize numerous other capabilities, but these will not alter the basic principles outlined above.

Figure 4:
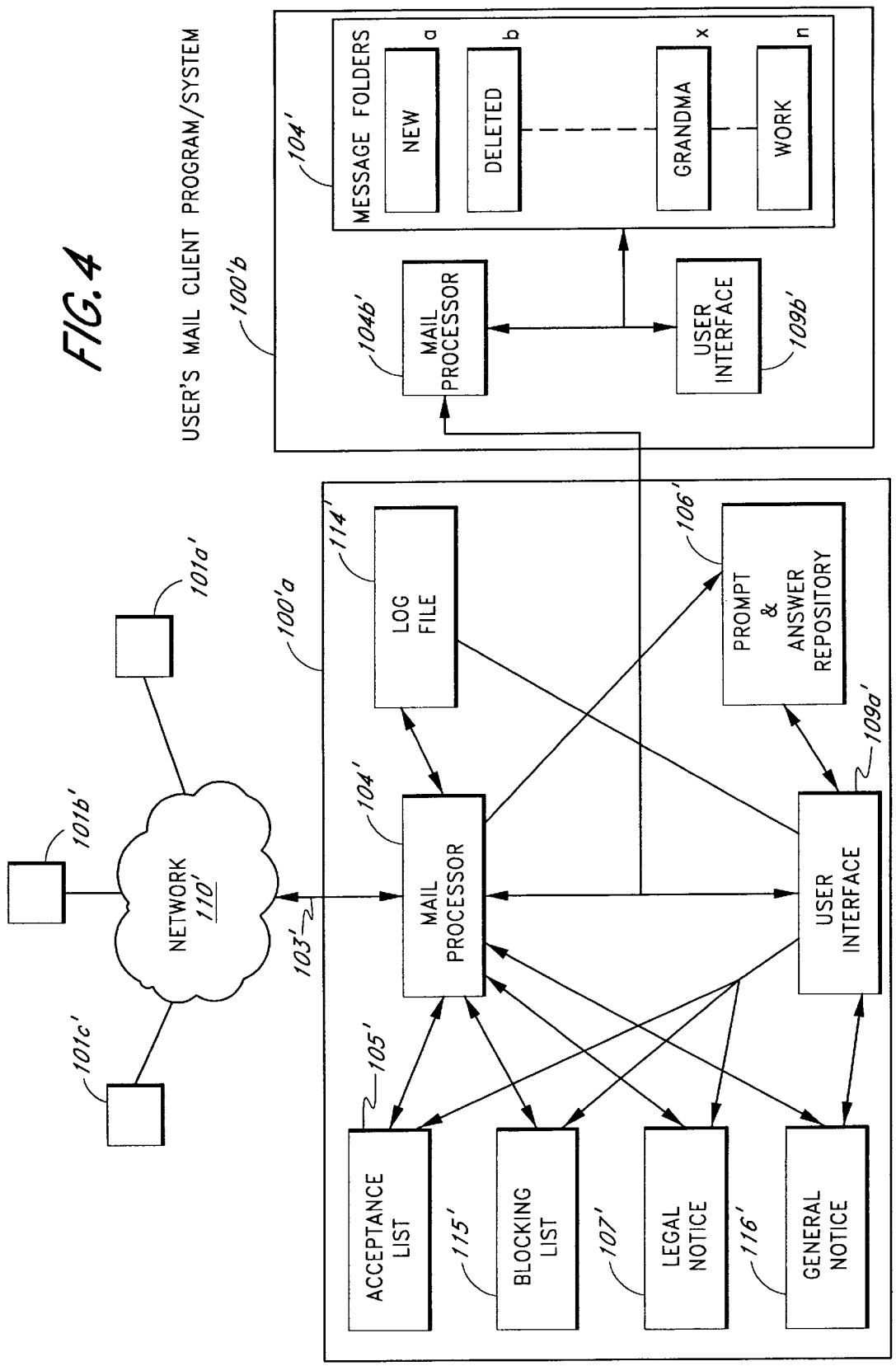
FIG. 4 is another example of a networking system in which the present invention can operate.

FIG. 4 is another example of a networking system in which the present invention can operate. In this example, the Filtering Enabled Email Client Program 100 from FIG. 3 has been split into two separate programs—Message Filtering Program 100*a*' and Email Client Program 100*b*'. As before, both of these programs are resident and run on an appropriate computer system, but the systems can be separate (i.e. two computers, one running each component).

The Message Filtering Program 100*a*' contains all message filtering components of the present invention. The Email Client Program 100*b*' consists of a normal email client and does not have the ability to filter incoming messages according to the present invention. During normal operation of FIG. 4, the Email Client Program 100*b*' will retrieve messages through the Message Filtering Program 100*a*'. While messages are being retrieved, the Message Filtering Program 100*a*' will challenge, block and delete all appropriate message according to the flow diagram in FIG. 4. Incoming messages which are not blocked are allowed to pass through to the Email Client Program 100*b*'. And, as before, outgoing messages are transmitted unimpeded.

In this figure, both programs have a User Interface (109*a*' and 109*b*'). This allows the use and configuration of each program separately. Each program also has a Mail Processor (104*a*' and 104*b*'). In this figure, Mail Processor 104*b*' only has the ability to send and receive email. Mail Processor 104*a*', however, retains the ability to analyze and filter incoming messages as well as also having the ability to send and receive mail (which come from and go to the Email Client Program).

Except for these differences, the components of FIG. 4 work as described with regard to the system of FIG. 3.

Figure 5:
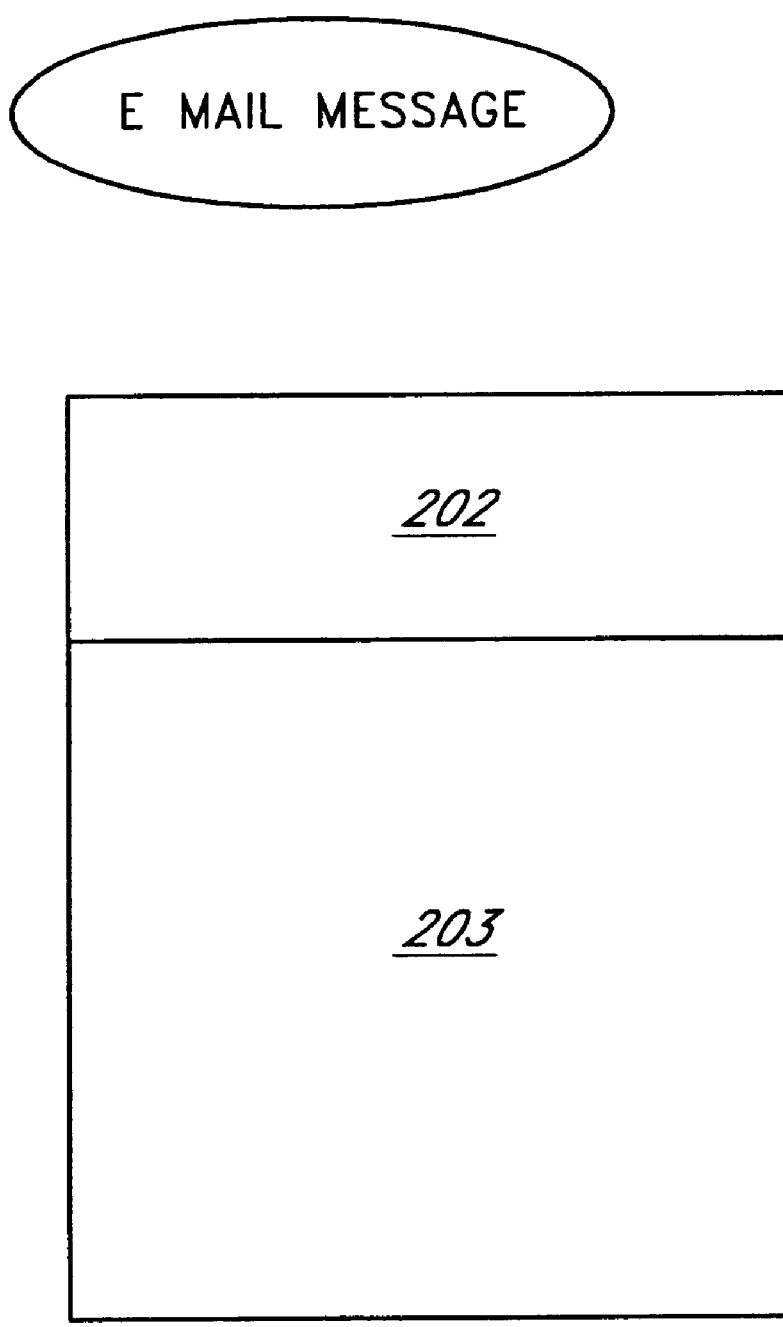
FIG. 5 is a diagram of a typical electronic message.

FIG. 5 shows an example Internet email message 201. This message is composed of a message header 202 and message body 203. The message body 203 contains the substance of the message and is the part which is intended for the message recipient. It will typically include text, but may also include files, pictures, sound, video, etc. depending on the particular messaging system being used. The message header 202 contains information about the message and the message body ("meta" data). This information usually includes the message sender, the message recipient, the subject of the message, the length of the message, the time the message was composed, etc. Many other pieces of information and combinations are possible.

Figure 6:
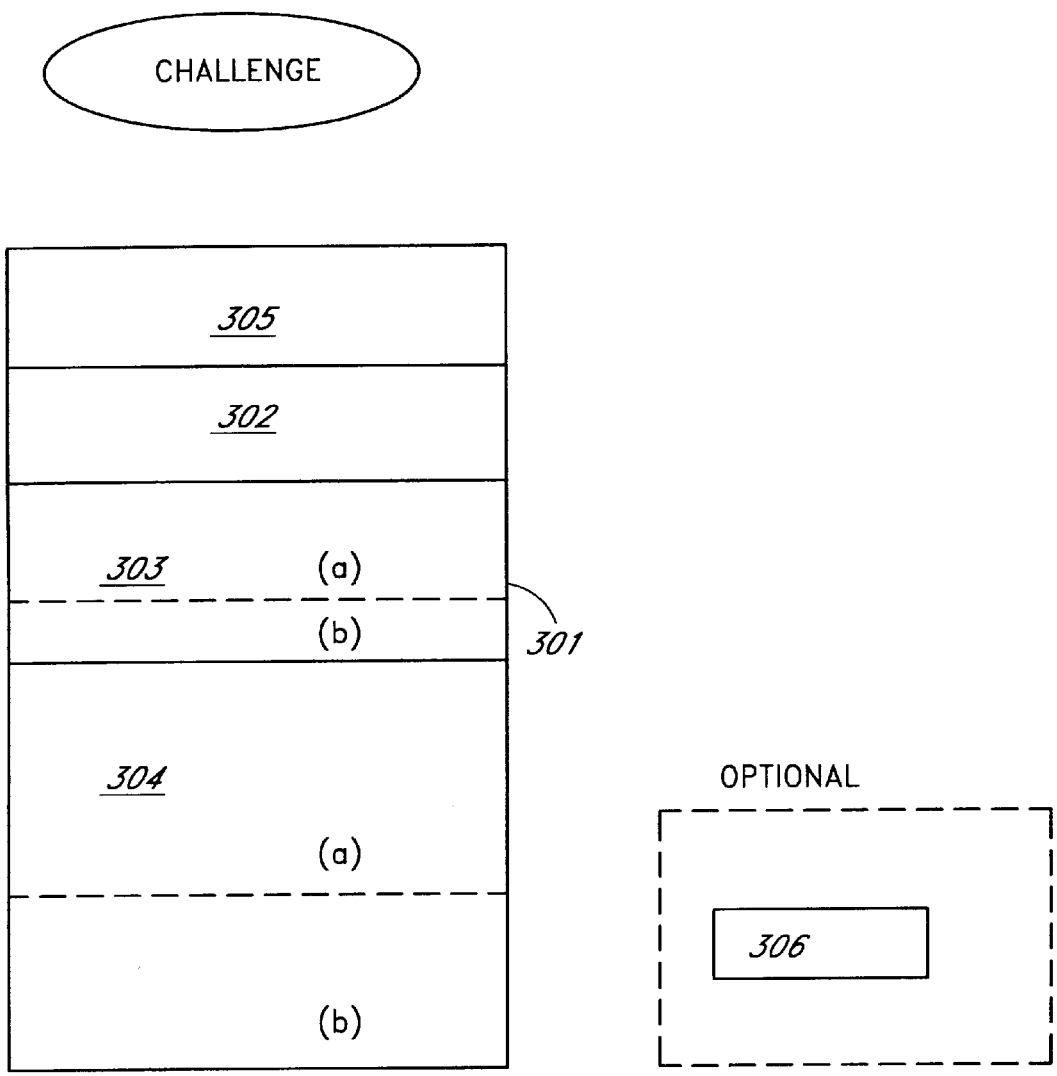
FIG. 6 is an example of a challenge and its components according to the present invention.

FIG. 6 shows the composition of a Challenge 301. The Challenge is a section of text which is preferably inserted in the body 203 of an email message 201. Once inserted, this newly modified message is returned to the sender. The challenge consists of a Header 305, General Notice 302, Legal Notice 303 and Prompt 304.

During insertion of the Challenge into the sender's message, the sender's original message in the message body 203 is retained. The Challenge text is simply placed in the message, preferably placed before the body of the text of the original message. This preserves the sender's original message so the recipient may view it if and when the Challenge is answered properly.

Challenge

The beginning of the Challenge contains a Header 305. The header is an Invention specific block of text that identifies the presence of this Invention and the version of the Invention software. Other possible elements could include a copyright notice, a phone number or Web site address in order to purchase or inquire about the Invention, etc. A Sample Header is shown below:

<##Efilter;V1.2##> EFILTER Electronic Message Filtering System Copyright © 1997 High-Tech Industries.

For information about purchasing, contact 800-999-9999 or http://www.acme.com

In this header, it is important to note the "<##Efilter;V1.2##>". This will be referred to as a token and is similar to the Legal Answer Blank 303b and Prompt Answer Blank 304b delimiters.

This token is specifically constructed of certain text sequences that are highly unlikely to occur in a typical message unless placed there intentionally. This token can therefore be searched for to determine if a Message 201 contains a Challenge 301. This token would not only indicate the presence of a Challenge in an incoming message, but would also indicate the version of the software used to create it. The inclusion of a version number in the Challenge Header 305 would allow a program utilizing the method and system of the present invention to recognize and account for any differences among its implementations.

The General Notice 302 (retrieved from 107 of FIG. 3) is placed next in the Challenge. This will inform the user why their message has been returned and what they must do in order to reach the recipient.

The Legal Notice 303a (retrieved from 107 of FIG. 3) is place next in the Challenge. This serves to warn the sender that only certain messages are accepted by the recipient and that penalties will be charged for violation.

When composing the Challenge 301, the Mail Processor 104 will insert a blank, affirmation entry field 303b into the text after the Legal Notice 303a. This field, like the header token, will be delimited by certain predetermined characters that are chosen because of their unlikely probability of occurring in an email message unless placed there on purpose. For example, the affirmation blank 303b could be constructed as such:

"###>> <<###"

The choice of three pound signs and then two greater than symbols (with the opposite at the end of the entry blank) would be extremely unlike to occur in a normal email message unless placed there on purpose.

The original sender of the message would be instructed to type the word "AGREE" in the entry space between the two delimiters thereby signaling their understanding and agreement to the Legal Notice.

"###>>AGREE<<###"

By searching for these delimiters (and what is contained between them), the Mail Processor 104 can scan a response (to a Challenge) and determine if the sender has correctly entered a proper response, such as "Agree".

Rather than "agree", another word or phrase or even a varying range of affirmative responses can be used. This could be set up similar to the Challenge prompt such that a different affirmative response is required for each Challenge. By doing this, it would become difficult for an email solicitor to automate the response to the Legal Notice.

Prompt 304a

Prompt 304a is retrieved from the Prompt Repository 106 and placed next in the Challenge 301.

As in the case of the Legal Notice Affirmation Blank 303b, the Mail Processor 104 will insert a blank entry field 304b into the Challenge 301 after the prompt. The sender will be instructed to answer the prompt and enter their response in the Answer Blank 304b. As also in the previous case (303b), the Answer Blank 304b will be delimited by predetermined characters that have a low probability of occurring naturally in an email message. For example, the Answer Blank 304b could be constructed as:

"##>>> <<<##4#"

Unlike the Legal Affirmation blank 303a, the answer blank is preferably constructed differently in order to differentiate the two for searching and retrieval purposes. Also unlike Legal Notice Answer Blank 303b, the Answer Blank 304b delimiters would include the reference number of the prompt which was being asked. In this case, the number 4 embedded in the delimiters would notify the Mail Processor 104 that the answer in blank 304b is in response to Prompt number 4 from the Prompt Repository 107.

The reference number assists the Mail Processor 104 in evaluating and processing a returned Challenge. Without use of the prompt reference number, the Mail Processor would have to parse the specific prompt text and attempt to match it with the exact prompt in the Prompt Repository 106. This would be very unreliable since the Internet (and other mail systems) have a tendency to slightly, or even dramatically, reformat a message as it passes from a sender to a receiver.

Since the Answer Blank 304b is small and the delimiters are specifically chosen for their relative uniqueness, it becomes very easy to scan the message body 203 and extract these delimiters (and the contents between them). By adding the prompt reference number to a portion of one of the delimiters, it also becomes easy to extract. Once the prompt reference number is known, the answer in the Answer Blank 304b can easily be compared and evaluated for correctness.

In addition to adding a reference number to each answer blank, it would also be beneficial to encrypt the reference number. Without encrypting the number, it becomes possible for an organization to catalog and record answers to specific prompt numbers for an individual. It is conceivable that a site might attempt to retrieve multiple prompts and answer pairs from an individual and record them. This organization could then sell or use this list for the purpose of automating Responses to that individual. By encrypting the reference number, prompt #4 might be used numerous times in a Challenge, but the result of encrypting "4" (which would be placed in the delimiter) would differ each time. It would be extremely difficult for a site to catalog the reference numbers from multiple Challenges.

Challenge Identifier (Optional) 306

In messaging systems that allow modification of the Message Header 202, it can be beneficial to include information in this section of the message. The Internet is one such system that allows the insertion of additional information into a message header 202.

When composing a challenge and modifying the incoming message, additional information should also be placed into the Message Header. This additional information would indicate the presence of a Challenge, the version of this Invention used to create the Challenge, the Reference Number of the Prompt used in the Challenge, etc.

There are at least two benefits to this approach.

(1) The header of a message is usually much more fixed in format than the message body 203. This makes it easier to search and locate, with precision, various important pieces of information mentioned above. And (2) it is possible on the Internet, for example, to retrieve and process only the message header 202 without retrieving the message body 203. By doing this, the message may be evaluated and subsequently deleted (by the mechanisms described herein) without incurring the cost and time of downloading the entire message.

On the Internet, a sample Challenge Identifier 306 embedded in a Message Header 202 could resemble:

... [header information]
X-EFILTER: Challenge Present
X-EFILTER: Version=1.2
X-EFILTER: Prompt Number=4
... [additional header information]. . .

FIG. 7 shows a flow diagram of the Mail Filtering Process. Mail Processor 104 traverses this diagram for each incoming message 201. Recall that outgoing message are also handled by the Mail Processor, but do not undergo a filtering process. Instead, they are simply delivered to the Network 110 via Link 103.

Start 401

The Mail Processor 104 begins at Start 401. It begins the filtering process after a signal of some kind. This signal could be, for example, notification from the Network 110 (via Link 103) that new mail is incoming; an explicit command from the user; or perhaps, after a certain time interval such as once every hour.

Check For Incoming Message 405

After Start 401, the Mail Processor queries the Network 110 to determine if any mail is incoming.

No Incoming Message—Done 410

State 410 is the trivial case where there is no incoming mail. In this case, the Mail Processor has nothing to do and will stop. The Mail Processor will reawaken and begin again at Start 401 after one of the previously mentioned signals. Incoming message. Is it Properly Addressed to Recipient? 412

The incoming message is checked to see if it is properly addressed to the recipient. Note that the recipient might be a primary designated recipient (such as "TO:") or a secondary recipient (such as "CC:" (carbon copy) or "BCC:" (blind carbon copy).

Any message which is not properly addressed to the recipient will be assumed to be a junk email communication and dealt with appropriately (typically deleted). The user can configure various parameters which determine whether an incoming message is "properly" addressed to the recipient depending on such conditions as whether the recipient's email address is present in the message's recipient fields, which recipient field(s) the recipient's address appears in, how many secondary recipient addresses (those not belonging to the user) are present in the message's recipient fields, and which message recipient fields contain those secondary addresses.

On the Internet, for example, it is possible for a user to receive a message which is not addressed to them in any way. In other words, such a message does not contain the user's email address (or name) in any of the message's recipient fields. Such fields may include TO (which generally indicates the main message recipients), CC (which generally indicates carbon copy recipients), or perhaps BCC (which generally indicates blind carbon copy recipients). There may be other possible message recipient fields. It is an option of the present invention to identify such incoming messages as junk email and deal with them appropriately.

On the Internet, for example, it is possible for a user to receive a message which is not solely addressed to them. This condition would exist if the message's recipient fields contained the user's address and also contained addresses of other (secondary) recipients. It is an option of the present invention to identify as junk email any incoming message which is not solely addressed to the recipient. It is also an option of the present invention to identify as junk email any incoming message which is not solely addressed to the recipient when the number of secondary recipients of the message exceeds a predetermined threshold (10 for example).

In other words, a user could select from the following example options (among others) when configuring this invention:

(1) Accept incoming email regardless of message's recipients.

(2) Accept incoming email only if I am one of the message's recipients.

(3) Accept incoming email only if I am the sole message recipient (no other recipients in the message's recipient fields).

(4) Accept incoming email only if I am one of the message's recipients and there are no more than N other message recipients.

(5) Accept incoming email only if I am the sole primary message recipient (i.e. my address is the only recipient address in the TO: recipient field).

(6) Accept incoming email only if I am a primary message recipient (i.e. my address is in the TO: recipient field) and there are no more than N other primary recipients.

There are other possible combinations. Message Not Properly Addressed to Recipient 413

If the incoming message is not properly addressed to the recipient, the Mail Processor will transfer the message to the "Deleted" Message Folder 108x (x being a number between a ... n). The Mail Processor then proceeds back to 405 and checks for another incoming message.

Determine if Sender is on Block List 415

If an incoming message is for the recipient, the Mail Processor extracts the sender's address from the Message and determines if the sender's address is present on Blocking List 115.

Sender's Address is on a Blocking List—Block Message 420

If the sender's Address is on Blocking List 115, it means that the user has specified that all messages from this sender are unwanted. The Mail Processor will transfer the message to the "Deleted" Message Folder 108x (x being a number between a . . . n). The Mail Processor then proceeds back to 405 and checks for another incoming message.

Sender not on Blocking List. Determine if on Acceptance List 425

The Mail Processor has already determined that the Sender of the incoming message is not present on the Blocking List. The Mail Processor now checks to see if the incoming message sender's address is on Acceptance List 105.

Sender's Address is on Acceptance List—Accept Message 430

If the sender's Address is listed on the Acceptance List, the message will be accepted by the Mail Processor 104 and placed in the "New" message folder (for example, message folder) 108x (x being a variable indicating one of the message folders 108).

Does Message Contain a Challenge? 435

The message has not been accepted or blocked based on the sender's address. The Mail Processor must now determine if the incoming message contains a Challenge. To do this, the Mail Processor 104 scans the message body 203 for the Header 305 token ("<##Efilter;V1.2##>"). If found, the incoming message contains a Challenge.

Note that the Mail Processor can also scan the Message Header 202 in messaging systems (such as the Internet) that allow non-standard additions to the portion of a message.

No Challenge Found in Message 440

If the incoming message does not contain a Challenge then the message is from a new, unrecognized sender that has never correctly answered a Challenge and/or never been placed on the Blocking List 115. In this situation, the message sender will be Challenged in an attempt to exclude junk email (which this message could be).

Before going through the trouble of composing and returning a Challenge, however, the Mail Processor 104 uses some simple heuristics to determine if the message sender's address is valid. As mentioned before, on the Internet, it is possible to send a message that doesn't include a valid sender address.

Various heuristics can be applied to an email address to determine if it is valid. These heuristics will vary depending on the messaging standards of the medium of transmission. On the Internet, for example, an email address must contain the symbol '@'. An email address without this symbol is invalid.

The Message Sender's Address is Invalid 445

If the sender's address is determined to be invalid, it is useless to create and return a Challenge because it will simply "bounce back" and be returned as "address unknown". Messages with invalid sender addresses are moved by the Mail Processor 104 to the "Deleted" Message Folder 108x.

The Message Sender's Address Appears to be Valid 450

If the message sender's address has been determined to be valid (as best possible). The Mail Processor 104 will compose a Challenge 301 and attach it to the beginning of the original incoming message. This newly modified message (also referred to in its entirety as a "Challenge") is then be returned to the message sender (delivered by Mail Processor 104 to the Network 110).

Message Contains Challenge. Is Response Correct? 460

If the incoming message contains a Challenge 301 the Mail Processor extracts the Legal Notice response (in 303b) and the Prompt response (including prompt reference number) (in 304b) and evaluates them to determine if they are valid or not. Both responses must be valid in order to pass the Challenge.

Response to Challenge is Invalid 465

If either the Prompt 304b or Legal Notice response 303b is invalid the message is blocked and placed in the "Deleted" Message Folder 108x.

Response to Challenge is Valid 470

If both the Prompt 304b and Legal Notice responses 303b are valid the message is accepted and placed in the "New" Message Folder 108x. In addition, the sender's address is entered into the Acceptance List 105. This assures that all future emails from this sender are accepted without the issuing of a Challenge (unless the Acceptance List 105 is cleared manually by the user, or unless the sender's address is subsequently added to the Blocking List 115).

Miscellaneous Variations

A useful feature, anticipated, but not implemented in the preferred embodiment would involve a modification of the Acceptance List 105. Recall that this list includes addresses of all sender's whose email messages may pass through, unimpeded, to the recipient. By adding extra information to the Acceptance List, it would be possible to automatically categorize all incoming messages. For example, an entry in the Acceptance List allowing a grandmother to communicate with the recipient might consist of:

"grandma@company.com"

By adding an additional piece of information to this list entry, we could automatically send all of grandma's email messages to the "Grandma" Message Folder 108x (assuming one exists). This modified Acceptance List entry might look like:

"grandma@company.com,Grandma"

The first entry is the sender address (or address pattern) to accept. The second entry is the Message Folder in which to place all messages from the respective sender. Acceptance list entries are automatically generated. The user simply adds a message folder designation.

It should be noted that it would be beneficial for some users of this Invention to included some or all elements of the Challenge in multiple languages. For example, the Legal Notice could consist of an English and Spanish version for a user that expects messages from a speaker of foreign languages. There is nothing in the design of this Invention that precludes the use of multiple language texts and Prompts.

Note also that the method and system according to the present invention could be configured to create and return a Challenge in the native language of whatever domain the message originated from. On the Internet, for example, messages can arrive from different domains which represent different countries. An incoming message from the ".jp" domain would indicate Japan and an appropriate Challenge in Japanese could be created and returned. All parts of the Challenge could be tailored to the message origination location including the Legal Notice, General Notice and Prompt.

A method and system for filtering unsolicited electronic commercial messages has been disclosed. Software written according to the present invention is to be stored in some form of computer readable medium, such as memory or CD ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for filtering electronic messages, the method comprising:
   receiving an electronic message from a sender, the message including an address field containing a sender's address;
   comparing the sender's address to a list of accepted senders;
   sending a prompt back to the sender if the sender's address is not contained in the list of accepted senders, wherein the prompt is designed to be answered by a person and not a machine.

2. The method of claim 1, wherein the electronic message is an e-mail.

3. The method of claim 1, further comprising a step of determining if information regarding the sender is listed on a predetermined list.

4. The method of claim 1, further comprising a step of not filtering out the message if information regarding the sender is listed on the list of accepted senders.

5. The method of claim 1, further comprising a step of comparing the sender's address to a list if blocked addresses and filtering out the message if information regarding the sender is listed on the list.

6. The method of claim 1, further comprising a step of automatically adding information regarding the sender to a list.

7. The method of claim 1, further comprising a step of determining if the received electronic message is properly addressed to a predetermined receiver.

8. The method of claim 7, wherein a message is filtered out if the received electronic message is not properly addressed to the predetermined receiver.

9. The method of claim 1 additionally comprising a step of receiving a response to the prompt and adding the sender's address to the list of accepted senders if the response to the prompt is correct.

10. The method of claim 1 additionally comprising a step of receiving a response to the prompt and adding the sender's address to a list of blocked senders if the response to the prompt is incorrect.

11. The method of claim 10 additionally comprising a step of deleting the response if the response does not contain a correct answer to the prompt.

12. The method of claim 11 wherein the step of deleting the response comprises moving the response to a deleted messages folder.

13. The method of claim 1 wherein the sender's address field is a reply address field and the sender's address is a reply address for the sender.

14. The method of claim 1, wherein the step of additionally comprising a step of comparing the sender's address to a list of blocked senders, wherein the step of sending a prompt to the sender comprises sending a prompt to the sender only if the sender's address is not in the list of accepted senders and not in the list of blocked senders.

15. The method of claim 14 additionally comprising a step of deleting the message if the sender's address is in the list of blocked senders.

16. The method of claim 1 additionally comprising a step of adding the sender's address to the list of accepted senders if the sender correctly responds to the prompt.

17. A system for filtering electronic messages, the system comprising:
   means for receiving an electronic message from a sender;
   means for determining that a return address of the sender is an accepted sender's address;
   means for sending a prompt back to the sender if the return address is not an accepted sender's address, wherein the prompt is designed to be answered by a person and not a machine.

18. The system of claim 17, wherein the means for determining comprises means for determining if the address is listed on a list.

19. The system of claim 18, further comprising means for not filtering out the message if information regarding the sender is listed on the list of accepted senders.

20. The system of claim 18, further comprising means for filtering out the message if information regarding the sender is listed on a list of blocked senders.

21. The system of claim 17, further comprising means for adding information regarding the sender to a list.

22. The system of claim 17, further comprising means for determining if the received message is properly addressed to a predetermined receiver.

23. The system of claim 22, wherein the received message is filtered out if it is not properly addressed to the predetermined receiver.

24. A computer readable medium containing program instructions for filtering electronic messages, the program instructions comprising:
   receiving an electronic message from a sender the message including an address field containing a sender's address;
   comparing the sender's address to a list of accepted senders;
   sending a prompt back to the sender if the sender's address is not contained in the list of accepted senders, wherein the prompt is designed to be answered by a person and not a machine.

25. The medium of claim 24 additionally comprising a step of receiving a response to the prompt and adding the sender's address to the list of accepted senders if the response to the prompt is correct.

26. The medium of claim 24 additionally comprising a step of receiving a response to the prompt and adding the sender's address to a list of blocked senders if the response to the prompt is incorrect.

27. The medium of claim 26 additionally comprising a step of deleting the response if the response does not contain a correct answer to the prompt.

28. The medium of claim 27 wherein the step of deleting the response comprises moving the response to a deleted messages folder.

29. The medium of claim 24 wherein the sender's address field is a reply address field and the sender's address is a reply address for the sender.

30. A method for filtering electronic messages, the method comprising:
   receiving an electronic message from a sender, the message including a sender's address field containing an address of the sender;
   comparing the sender's address to a list of accepted senders;
   sending a challenge back to the sender if the sender's address is not in the list of accepted senders, wherein the challenge is designed to be answered by a person and not a machine.

31. The method of claim 30, wherein the challenge includes a prompt.

32. The method of claim 30, wherein the challenge includes a legal notice.

33. The method of claim 32, wherein the legal notice includes text which cannot be altered once the text is sent to the sender.

34. The method of claim 30, further comprising a step of automatically updating the list of accepted senders.

35. The method of claim 30, wherein the challenge includes a program version number.

36. The method of claim 30, further comprising a step of determining if the received electronic message is properly addressed to a predetermined receiver.

37. The method of claim 36, wherein the received message is filtered out if it is not properly addressed to a predetermined receiver.

* * * * *